US009743478B2

(12) United States Patent
Yue et al.

(10) Patent No.: US 9,743,478 B2
(45) Date of Patent: Aug. 22, 2017

(54) LIGHT INTENSITY ADJUSTABLE ULTRAVIOLET DEVICE FOR CURING OPTICAL FIBER COATING

(71) Applicant: YANGTZE OPTICAL FIBRE AND CABLE JOINT STOCK LIMITED COMPANY, Wuhan, Hubei (CN)

(72) Inventors: Zheng Yue, Hubei (CN); Songtao Lu, Hubei (CN); Qinguo He, Hubei (CN); Ke Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/382,838

(22) Filed: Dec. 19, 2016

(65) Prior Publication Data

US 2017/0105257 A1 Apr. 13, 2017

Related U.S. Application Data

(63) Continuation of application No. PCT/CN2015/096102, filed on Dec. 1, 2015.

(30) Foreign Application Priority Data

Jul. 31, 2015 (CN) .......................... 2015 1 0462187

(51) Int. Cl.
  *C03C 25/64* (2006.01)
  *C03C 25/12* (2006.01)
  (Continued)

(52) U.S. Cl.
  CPC ......... *H05B 33/0848* (2013.01); *B05D 3/065* (2013.01); *G01J 1/429* (2013.01)

(58) Field of Classification Search
  CPC ..... C03C 25/12; C03C 25/6226; B05D 3/067; B05D 3/06; B29C 71/04; B01J 19/123; G02B 6/02395; G02B 6/448
  (Continued)

(56) References Cited

U.S. PATENT DOCUMENTS 4,636,405 A * 1/1987 Mensah ................ B01J 19/123
  118/641
5,366,527 A * 11/1994 Amos ..................... C03C 25/12
  118/420

(Continued)

FOREIGN PATENT DOCUMENTS

CN 101657060 A 2/2010
CN 103319100 A 9/2013

(Continued)

*Primary Examiner* — David A Vanore
(74) *Attorney, Agent, or Firm* — Tim Tingkang Xia, Esq.; Locke Lord LLP

(57) ABSTRACT

A light intensity adjustable ultraviolet device for curing an optical fiber coating includes a cylindrical mounting base; a UVLED light source module mounted along a peripheral direction and an axial direction in an inner cavity of the cylindrical mounting base; a cylindrical focusing lens configured in front of a light emitting surface of the UVLED light source module, so that ultraviolet light emitted by the UVLED light source module is focused on a curing axis; and an ultraviolet sensor mounted in the inner cavity of the cylindrical mounting base, wherein the ultraviolet sensor is connected to a UVLED power supply control module via an ultraviolet intensity signal processing module; the UVLED power supply control module is connected to the UVLED light source module, so that an optical fiber drawing speed and an ultraviolet intensity form a control closed loop.

16 Claims, 2 Drawing Sheets

(51) Int. Cl.
  *H05B 33/08* (2006.01)
  *G01J 1/42* (2006.01)
  *B05D 3/06* (2006.01)

(58) Field of Classification Search
  USPC ........ 250/504 R, 492.1, 493.1, 503.1, 491.1,
      250/496.1; 427/163.2, 508, 558, 493,
      427/595, 559; 118/641, 663, 667;
      385/115
  See application file for complete search history.

(56) References Cited

U.S. PATENT DOCUMENTS

| | | | | |
|---|---|---|---|---|
| 5,763,003 | A * | 6/1998 | Bonicel | G02B 6/448 118/405 |
| 6,338,878 | B1 * | 1/2002 | Overton | B29C 35/10 427/163.2 |
| 7,022,382 | B1 * | 4/2006 | Khudyakov | C03C 25/6233 118/620 |
| 7,399,982 | B2 * | 7/2008 | Siegel | B41J 3/407 250/494.1 |
| 7,923,706 | B2 * | 4/2011 | Brassell | B29C 71/04 250/493.1 |
| 8,809,813 | B1 * | 8/2014 | Chen | A61L 2/0047 250/492.1 |
| 8,993,983 | B2 * | 3/2015 | Li | F26B 3/28 118/620 |
| 9,187,367 | B2 * | 11/2015 | Molin | B05D 3/067 |
| 2003/0026919 | A1 * | 2/2003 | Kojima | C03C 25/12 427/558 |
| 2006/0233501 | A1 * | 10/2006 | Sampson | F26B 3/28 385/115 |
| 2010/0183821 | A1 * | 7/2010 | Hartsuiker | C03C 25/12 427/513 |
| 2011/0088841 | A1 * | 4/2011 | Thunhorst | B29C 39/148 156/307.5 |
| 2012/0009358 | A1 * | 1/2012 | Gharbi | C03C 25/12 427/595 |
| 2012/0040105 | A1 * | 2/2012 | Overton | C03C 25/12 427/558 |
| 2017/0107145 | A1 * | 4/2017 | Suyama | C03C 25/6226 |

FOREIGN PATENT DOCUMENTS

| | | |
|---|---|---|
| CN | 103699159 A | 4/2014 |
| CN | 203683387 U | 7/2014 |
| CN | 105060739 A | 11/2015 |
| EP | 1151971 A | 11/2001 |

* cited by examiner

LIGHT INTENSITY ADJUSTABLE ULTRAVIOLET DEVICE FOR CURING OPTICAL FIBER COATING

CROSS-REFERENCE TO RELATED APPLICATIONS

This application is a continuation application of International Patent Application No. PCT/CN2015/096102, filed Dec. 1, 2015, which itself claims priority to Chinese Patent Application No. 201510462187.1, filed Jul. 31, 2015 in the State Intellectual Property Office of P.R. China, which are hereby incorporated herein in their entireties by reference.

TECHNICAL FIELD

The present invention relates to a device for performing efficient curing on a coating layer of optical fibers drawn at a high speed, and in particular, to a light intensity adjustable ultraviolet device for curing an optical fiber coating, and belongs to the technical field of optical fiber manufacturing devices.

BACKGROUND

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

One or more coating layers are generally provided on an outer surface of optical fibers as a protection layer thereof. In a typical process of an optical fiber drawing process, when a preform is collapsed, pulled, and drawn into bare optical fibers, two or more coatings need to be coated online. Generally, a relatively soft inner coating prevents optical fibers from generating microbending and a relatively hard outer coating provides additional protection and a better operability for the optical fibers. The organic polymer coatings can be cured onto an optical fiber surface in manners of heating (heat curing) or ultraviolet irradiation (UV curing). UV curing of an optical fiber coating refers to triggering quick polymerization and crosslinking of liquid-state coating materials on optical fibers by using ultraviolet light, and making the liquid-state coating materials cured into solid materials instantaneously. Ultraviolet curing needs to expose a coating into high-intensity ultraviolet radiation. Improving the ultraviolet intensity can reduce curing time. However, reducing curing time is an important link for improving an optical fiber drawing linear speed so as to improve optical fiber production efficiency.

In a current optical fiber drawing process, a mercury lamp (such as a high-pressure mercury lamp and xenon-mercury lamp) is usually used to generate ultraviolet radiation. When the high-pressure mercury lamp works, currents pass through high-pressure mercury vapors, so that the currents are ionized and excited, thereby forming collision between electrons, atoms, and ions in a discharge tube for light emitting. A disadvantage of the mercury lamp is needing quite large power to generate ultraviolet radiation with sufficient intensity. For example, curing an optical fiber with a single coating layer (such as polymeric coating) may need 50 kw power consumption. Another disadvantage of the mercury lamp is: a large amount of energy for lightening the mercury lamp is emitted out in a form of heat energy rather than ultraviolet light, that is, a utilization rate of the mercury lamp on energy is low. Moreover, because the mercury lamp generates a large amount of heat, a mercury lamp curing device needs to be cooled to prevent the device from overheating.

Furthermore, a spectral width of electromagnetic radiation generated by the mercury lamp is large, including electromagnetic waves with wavelengths less than 200 nm and greater than 700 nm (such as infrared light). Generally, UV radioactive rays with wavelengths between 300 nm and 400 nm can be used for curing, and therefore most of the electromagnetic radiation generated by the mercury lamp is wasted.

With the development of ultraviolet light emitting diode (UVLED) technologies, as a UV radiation source, a UVLED has advantages such as higher energy efficiency, longer life (life of an electrodeless lamp is about 8,000 hours, while life of the UVLED is up to 30,000 hours), a less heating value, less energy consumption, and greater environmental friendliness (mercury is not contained, and ozone is not generated) as compared with the traditional mercury lamp. Applying the UVLED to replace the traditional mercury lamp for optical fiber coating and curing is advantageous. As compared with the traditional mercury lamp, energy needed by the UVLED device is prominently reduced, and less heat is correspondingly generated, and the efficiency is higher in optical fiber coating. However, there still exists an unaddressed need of which, particularly, a UVLED light source cannot perform automatic adjustment on ultraviolet intensity according to a real-time drawing speed and coating condition of optical fibers.

SUMMARY

One of the objectives of the present invention is to provide a light intensity adjustable ultraviolet device for curing an optical fiber coating, so as to solve shortcomings of the prior art. The light intensity adjustable ultraviolet device for curing an optical fiber coating not only has a reasonable and simple structural configuration, high curing efficiency, and low energy consumption, but also has a high degree of automation and high coating curing quality.

In one aspect of the present invention, the light intensity adjustable ultraviolet device includes a cylindrical mounting base; a UVLED light source module mounted along a peripheral direction and an axial direction in an inner cavity of the cylindrical mounting base; a cylindrical focusing lens configured in front of a light emitting surface of the UVLED light source module, so that ultraviolet light emitted by the UVLED light source module is focused on a curing axis. Further, an ultraviolet sensor is mounted in the inner cavity of the cylindrical mounting base; the ultraviolet sensor is connected to a UVLED power supply control module via an ultraviolet intensity signal processing module, the UVLED power supply control module is connected to the UVLED light source module, so that an optical fiber drawing speed and an ultraviolet intensity form a control closed loop.

In one embodiment, the ultraviolet sensor is mounted on a corresponding surface of an emit end of the UVLED light source module.

In one embodiment, a transparent quartz glass tube is mounted in the middle of the inner cavity of the cylindrical mounting base; the curing axis is located in an inner cavity of the transparent quartz glass tube; and an axis of the transparent quartz glass tube is overlapped with the curing axis.

In one embodiment, one end of the transparent quartz glass tube is in fluid communication with an air source of pressure, where the air source is an inert gas source, or a mixed gas source of inert gas and carbon dioxide.

In one embodiment, the UVLED light source module includes a UVLED light source and a radiator, where the UVLED light source includes a UVLED single lamp and/or a UVLED array, where the radiator is directly connected to a semiconductor cooler, and a temperature sensor is provided on the UVLED light source, and the temperature sensor is connected to a power supply control module of the semiconductor cooler via a temperature signal processing module.

In one embodiment, a hot end of the semiconductor cooler is connected to a water-cooling or an air-cooling apparatus.

In one embodiment, a space between the UVLED light source and the transparent quartz glass tube is in fluid communication with the air source of pressure, where the air source is the air source of inert gas, or the air source of the mixed gas of inert gas and carbon dioxide, and the air source cools the UVLED light source.

In one embodiment, the UVLED light source module is mounted at intervals along the peripheral direction of the inner cavity of the cylindrical mounting base; an arc concave reflecting mirror is provided at intervals of the peripheral direction; a center of curvature of an arc concave is located on the curing axis.

In one embodiment, the cylindrical mounting base is cylindrical, and is formed by splicing strip arc blocks along a peripheral direction, and is fixedly connected by a fixing end disk or a fixing ring; the UVLED light source module is embedded on an inner surface of the strip arc blocks, or an arc concave reflecting mirror is mounted on the inner surface of some of the strip arc blocks, where a quantity of the strip arc blocks is 4 to 8.

The present invention has, among other things, the following advantages: (1) the present invention uses an ultraviolet sensor to detect intensity of ultraviolet light output by a UVLED light source, so that an optical fiber drawing speed and the ultraviolet intensity form a control closed loop, and UVLED light source outputs and the optical fiber drawing speed adjust and match in real time, thereby ensuring and improving optical fiber coating curing quality, and efficiently using the UVLED light source and saving electric energy; (2) a semiconductor cooler is used to directly the UVLED light source; because a refrigeration response of a semiconductor is fast, and a temperature is easy to control, fluctuation of a working temperature of the UVLED light source can be made small, and the working temperature is always in an optimal working temperature interval, thereby not only improving photoelectric efficiency of the UVLED light source module, and saving electric energy, but also ensuring a longest service life of the UVLED light source; (3) the present invention also performs cooling and protection in a manner of blowing in inert gas (such as nitrogen) or other mixed gases into a working surface of the UVLED light source, so that a cooling effect can be increased; a UVLED light source device can be protected; effects of air on the UVLED and encapsulation can be weakened or eliminated, thereby further extending the service life of the UVLED light source module; and (4) the present invention has a high degree of automation and more convenient use operations.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION

Figure 1:
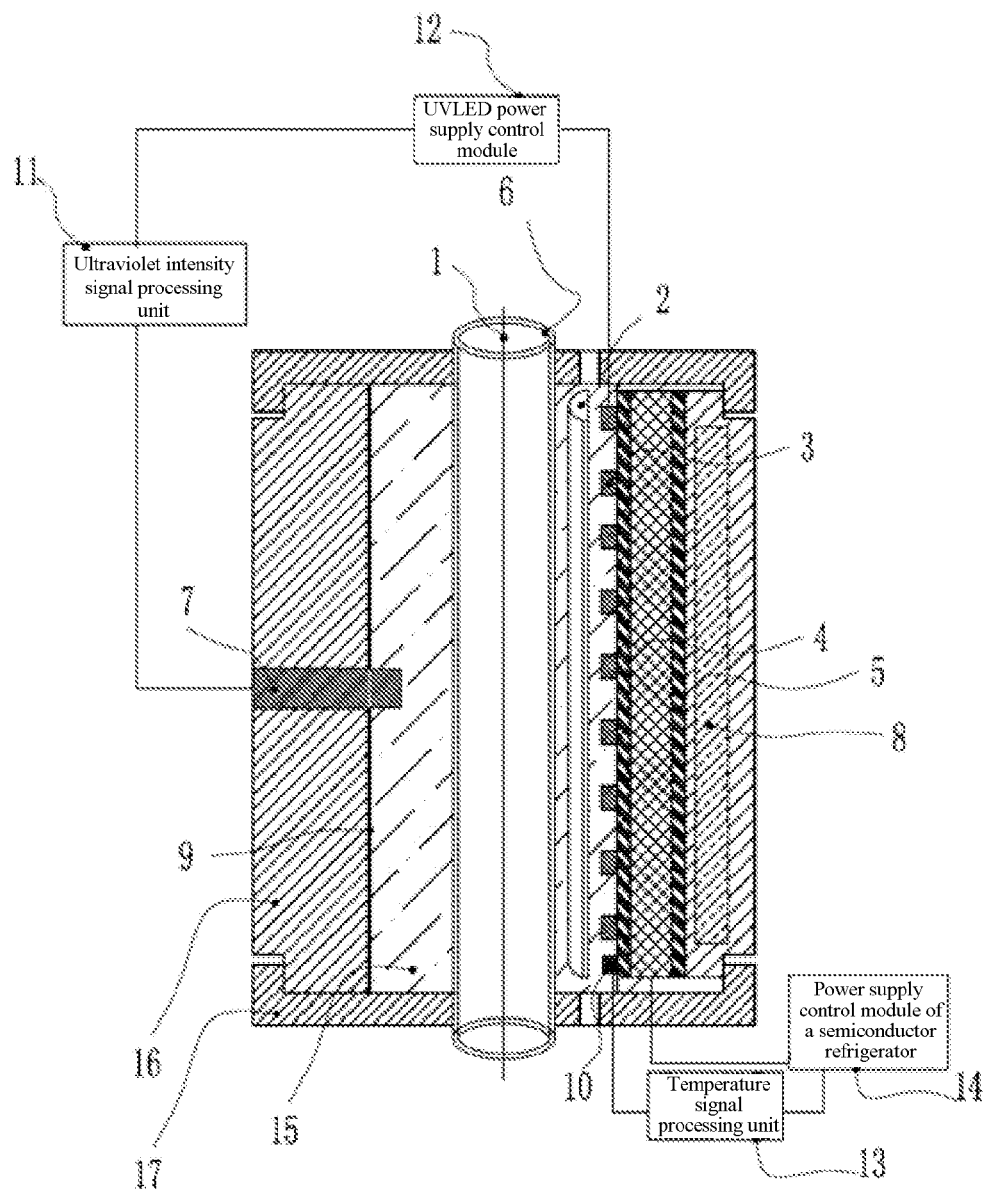
FIG. 1 is a front sectional view of a light intensity adjustable ultraviolet device for curing an optical fiber coating according to one embodiment of the present invention.
Figure 2:
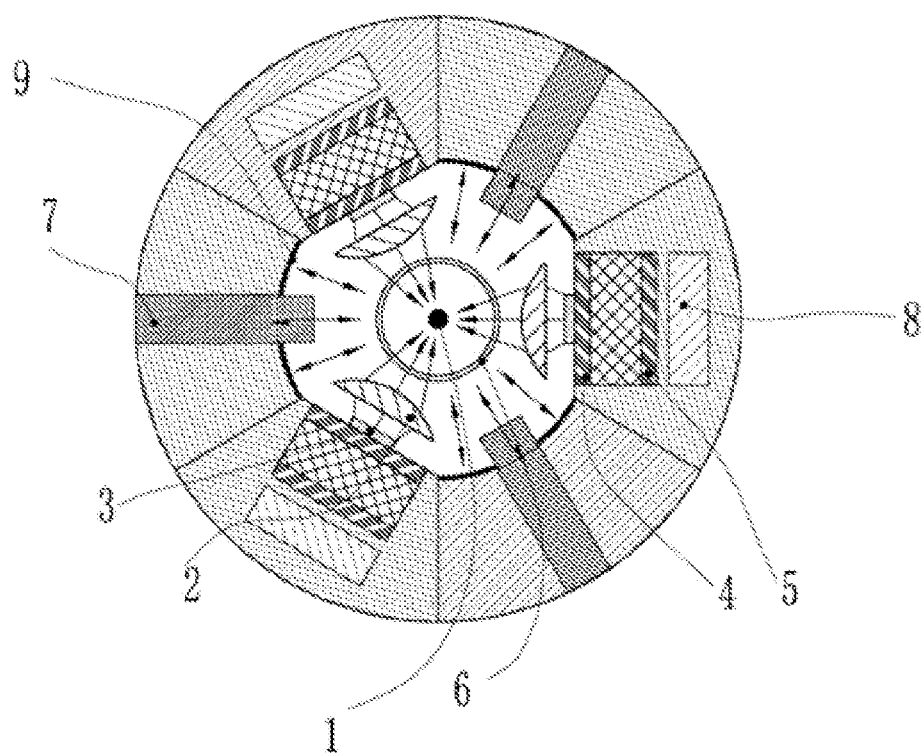
FIG. 2 is a top sectional view of the light intensity adjustable ultraviolet device shown in FIG. 1.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used.

Certain terms that are configured to describe the invention are discussed below, or elsewhere in the specification, to provide additional guidance to the practitioner regarding the description of the invention. It will be appreciated that same thing can be said in more than one way. The use of examples anywhere in this specification including examples of any terms discussed herein is illustrative only, and in no way limits the scope and meaning of the invention or of any exemplified term. Likewise, the invention is not limited to various embodiments given in this specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms.

These terms are only configured to distinguish one element, component, region, layer or section from another element, component, region, layer or section. Thus, a first element, component, region, layer or section discussed below could be termed a second element, component, region, layer or section without departing from the teachings of the disclosure. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

The description will be made as to the embodiments of the present invention in conjunction with the accompanying drawings. In accordance with the purposes of this invention, as embodied and broadly described herein, this invention, in one aspect, relates to a light intensity adjustable ultraviolet device for curing an optical fiber coating. As disclosed Chinese Patent Publication No. CN103319100 A, which is hereby incorporated herein in its entirety by reference, applicant developed an ultraviolet curing device of an optical fiber coating that includes a UVLED light source module mounted along a peripheral direction and an axial direction in an inner cavity of a cylindrical mounting base; a cylindrical focusing lens configured in front of a light emitting surface of the UVLED light source module, so that ultraviolet light emitted by the UVLED light source module is focused on a curing axis. A light source of the optical fiber coating curing device has a long service life, a less heating value, and low energy consumption, and the optical fiber coating curing device has good curing uniformity and high curing efficiency. However, in actual use, the UVLED light source module cannot perform automatic adjustment on ultraviolet intensity according to a real-time drawing speed and coating condition of optical fibers, which not only causes energy waste, but also affects curing quality of the optical fiber coating.

One of the objectives of the invention is to provide a light intensity adjustable ultraviolet device with a UVLED light source module that can perform automatic adjustment on ultraviolet intensity according to a real-time drawing speed and coating condition of optical fibers.

In certain embodiments, a light intensity adjustable ultraviolet device for curing an optical fiber coating includes a circular cylindrical mounting base, a UVLED light source module, a cylindrical focusing lens, and an ultraviolet sensor.

The cylindrical mounting base is formed by splicing six strip arc blocks 16 along a peripheral direction, and is fixedly connected by a vertical fixing end disk 17. The UVLED light source module is embedded on an inner surface of the six strip arc blocks at intervals in a peripheral direction. An arc concave reflecting mirror 9 is provided in a staggered manner at intervals in the peripheral direction, where a length of the arc concave reflecting mirror is equal to that of the strip arc block, and a center of curvature of an arc concave is located on the curing axis. The reflecting mirror is mounted corresponding to the UVLED light source module. The ultraviolet sensor 7 is mounted on the strip arc block on which the reflecting mirror is mounted. The ultraviolet sensor is connected to a UVLED power supply control module 12 via an ultraviolet intensity signal processing module 11, and the UVLED power supply control module is connected to the UVLED light source module, so that an optical fiber drawing speed and an ultraviolet intensity form a control closed loop. The intensity of ultraviolet light emitted by each UVLED light source module is controlled and adjusted in real time according to the optical fiber drawing speed. The UVLED light source module includes a UVLED light source 3 and a radiator 4. In certain embodiments, UV light wavelengths of the UVLED light source are 385 nm and 395 nm. The radiator is directly connected to a semiconductor cooler 5. A temperature sensor 10 is provided on the UVLED light source. The temperature sensor is connected to a power supply control module 14 of the semiconductor cooler via a temperature signal processing module 13. A hot end of the semiconductor cooler is connected to a water-cooling or an air-cooling apparatus 8.

In certain embodiments, the UVLED light source includes a UVLED array. The cylindrical focusing lens 2 is configured in front of a light emitting surface of the UVLED light source module, so that ultraviolet light emitted by the UVLED light source module is focused on a curing axis 1, thereby forming a section of UV light beam with strong light intensity, where the light beam has a shape similar to a cylinder, and a diameter of 3 mm.

In certain embodiments, a transparent quartz glass tube 6 is mounted in the middle of an inner cavity of the cylindrical mounting base, where the curing axis is located in an inner cavity of the transparent quartz glass tube; and an axis of the transparent quartz glass tube is overlapped with the curing axis. In certain embodiments, a diameter of the transparent quartz glass tube is about 25 mm, and an inner diameter thereof is about 21 mm. One end of the transparent quartz glass tube is in fluid communication with an air source of pressure. In certain embodiments, the transparent quartz glass tube is formed of fused silica or fused quartz. In certain embodiments, the air source is an inert gas source, or a mixed gas source of inert gas and carbon dioxide.

In an optical fiber drawing process, optical fibers with a coating pass through an inner cavity of a curing device approximately along the curing axis, that is, pass through the UV light beam, and paint of the coating absorbs UV rays for curing. At the same time, one end of the transparent quartz glass tube is in fluid communication with the air source of pressure, and the air source of inert gas is led into the transparent quartz glass tube.

In addition, a space between the UVLED light source and the transparent quartz glass tube also communicates with the air source of pressure, and the air source 15 of inert gas is led into the space for cooling the UVLED light source, so that a cooling effect can be increased; a UVLED light source device can be protected; and effects of air on the UVLED and encapsulation can be weakened or eliminated.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A light intensity adjustable ultraviolet device for curing an optical fiber coating, comprising:
   a cylindrical mounting base;
   a UVLED light source module mounted along a peripheral direction and an axial direction in an inner cavity of the cylindrical mounting base;
   a cylindrical focusing lens configured in front of a light emitting surface of the UVLED light source module, so that ultraviolet light emitted by the UVLED light source module is focused on a curing axis; and
   an ultraviolet sensor mounted in the inner cavity of the cylindrical mounting base, wherein the ultraviolet sensor is connected to a UVLED power supply control module via an ultraviolet intensity signal processing module; the UVLED power supply control module is connected to the UVLED light source module, so that an optical fiber drawing speed and an ultraviolet intensity form a control closed loop.

2. The light intensity adjustable ultraviolet device according to claim 1, wherein a transparent quartz glass tube is mounted in the middle of the inner cavity of the cylindrical mounting base; the curing axis is located in an inner cavity of the transparent quartz glass tube; and an axis of the transparent quartz glass tube is overlapped with the curing axis.

3. The light intensity adjustable ultraviolet device according to claim 2, wherein one end of the transparent quartz glass tube is in fluid communication with an air source of pressure, wherein the air source is an inert gas source, or a mixed gas source of inert gas and carbon dioxide.

4. The light intensity adjustable ultraviolet device according to claim 3, wherein a space between the UVLED light source and the transparent quartz glass tube is in fluid communication with the air source of pressure, wherein the air source is the inert gas source or the mixed gas source of inert gas and carbon dioxide, and the air source operably cools the UVLED light source.

5. The light intensity adjustable ultraviolet device according to claim 1, wherein the UVLED light source module comprises a UVLED light source and a radiator, wherein the UVLED light source comprises a UVLED single lamp and/or a UVLED array, wherein the radiator is directly connected to a semiconductor cooler, and a temperature sensor is provided on the UVLED light source, and the temperature sensor is connected to a power supply control module of the semiconductor cooler via a temperature signal processing module.

6. The light intensity adjustable ultraviolet device according to claim 5, wherein a hot end of the semiconductor cooler is connected to a water-cooling or an air-cooling apparatus.

7. The light intensity adjustable ultraviolet device according to claim 1, wherein the UVLED light source module is mounted at intervals along the peripheral direction of the inner cavity of the cylindrical mounting base, an arc concave reflecting mirror is provided at intervals of the peripheral direction, and a center of curvature of an arc concave is located on the curing axis.

8. The light intensity adjustable ultraviolet device according to claim 1, wherein the cylindrical mounting base is cylindrical, and is formed by splicing strip arc blocks along a peripheral direction, and is fixedly connected by a fixing end disk or a fixing ring; the UVLED light source module is embedded on an inner surface of the strip arc blocks, or an arc concave reflecting mirror is mounted on the inner surface of some of the strip arc blocks, wherein a quantity of the strip arc blocks is 4 to 8.

9. The light intensity adjustable ultraviolet device according to claim 1, wherein the ultraviolet sensor is mounted on a corresponding surface of an emit end of the UVLED light source module.

10. The light intensity adjustable ultraviolet device according to claim 9, wherein a transparent quartz glass tube is mounted in the middle of the inner cavity of the cylindrical mounting base; the curing axis is located in an inner cavity of the transparent quartz glass tube; and an axis of the transparent quartz glass tube is overlapped with the curing axis.

11. The light intensity adjustable ultraviolet device according to claim 10, wherein one end of the transparent quartz glass tube is in fluid communication with an air source of pressure, wherein the air source is an inert gas source, or a mixed gas source of inert gas and carbon dioxide.

12. The light intensity adjustable ultraviolet device according to claim 11, wherein a space between the UVLED light source and the transparent quartz glass tube is in fluid communication with the air source of pressure, wherein the air source is the air source of inert gas, or the air source of the mixed gas of inert gas and carbon dioxide, and the air source cools the UVLED light source.

13. The light intensity adjustable ultraviolet device according to claim 9, wherein the UVLED light source module comprises a UVLED light source and a radiator, wherein the UVLED light source comprises a UVLED single lamp and/or a UVLED array, wherein the radiator is directly connected to a semiconductor cooler, and a temperature sensor is provided on the UVLED light source, and the temperature sensor is connected to a power supply control module of the semiconductor cooler via a temperature signal processing module.

14. The light intensity adjustable ultraviolet device according to claim 13, wherein a hot end of the semiconductor cooler is connected to a water-cooling or an air-cooling apparatus.

15. The light intensity adjustable ultraviolet device according to claim 9, wherein the UVLED light source module is mounted at intervals along the peripheral direction of the inner cavity of the cylindrical mounting base, an arc concave reflecting mirror is provided at intervals of the peripheral direction, and a center of curvature of an arc concave is located on the curing axis.

16. The light intensity adjustable ultraviolet device according to claim 9, wherein the cylindrical mounting base is cylindrical, and is formed by splicing strip arc blocks along a peripheral direction, and is fixedly connected by a fixing end disk or a fixing ring; the UVLED light source module is embedded on an inner surface of the strip arc blocks, or an arc concave reflecting mirror is mounted on the inner surface of some of the strip arc blocks, wherein a quantity of the strip arc blocks is 4 to 8.

* * * * *